United States Patent
Buzanoski

[19]

[11] Patent Number: 6,113,780
[45] Date of Patent: Sep. 5, 2000

[54] MECHANISM FOR REMOVING RESINOUS SLUDGE FROM A LIQUID RESIN VAT

[76] Inventor: Edmund L. Buzanoski, 22740 Nowlin St., Dearborn, Mich. 48124-2663

[21] Appl. No.: 09/251,321

[22] Filed: Feb. 16, 1999

[51] Int. Cl.[7] ................................................ B01D 35/027
[52] U.S. Cl. ........................ 210/171; 210/172; 210/238; 210/471; 210/495; 210/499; 425/84; 425/86
[58] Field of Search ..................................... 210/237, 238, 210/470, 471, 495, 499, 162, 171, 172, 513; 264/401; 425/84, 86, 174.4

[56] References Cited

U.S. PATENT DOCUMENTS

| | | | |
|---|---|---|---|
| 2,598,543 | 5/1952 | Hoffman et al. | 210/471 |
| 3,369,988 | 2/1968 | Williams | 210/237 |
| 4,575,330 | 3/1986 | Hull | 425/174.4 |
| 5,184,307 | 2/1993 | Hull et al. | 15/46 |

*Primary Examiner*—Matthew O. Savage
*Attorney, Agent, or Firm*—Charles W. Chandler

[57] ABSTRACT

Sludge accumulations can be quickly removed from a vat containing liquid resin, by a manual mechanism that includes a porous platform adapted to rest on the vat bottom wall. Lifter arms extend upwardly from the platform to mount lifter handles at the vat upper edges. The handles can be pulled upwardly to lift the porous platform out of the vat. Sludge is retained on the platform, while liquid resin drains into the vat.

12 Claims, 2 Drawing Sheets

MECHANISM FOR REMOVING RESINOUS SLUDGE FROM A LIQUID RESIN VAT

BACKGROUND AND SUMMARY OF THE INVENTION

This invention relates to a manual mechanism for removing resinous sludge from a liquid resin vat. The invention has particular application to a liquid resin vat that forms part of an apparatus for forming three-dimensional objects out of the liquid resin.

U.S. Pat. No. 4,573,330, issued to C. Hull on Mar. 11, 1986, disclosed an apparatus for generating three-dimensional objects by irradiating a liquid resin contained in an open-topped vat. Other patents owned by 3D Systems, at 26081 Avenue Hall, Valencia, Calif., show generally similar apparatus, wherein a laser is used as the irradiating device.

During the operation of such an apparatus, some resinous sludge is unavoidably created in the liquid resin. Periodically it is necessary to remove such resinous sludge from the vat. Otherwise, the sludge will act as a seeding mechanism to generate additional unwanted sludge.

The sludge removal operation typically involves draining the vat of the liquid resin, and manually scraping or scooping the sludge from the bottom wall of the tank. The operation is time-consuming, wasteful of the liquid resin, and hazardous to humans when cleaning the sludge.

The present invention relates to a mechanism that can be placed in the liquid resin vat, and periodically lifted out of the vat to remove sludge accumulations while leaving liquid resin in the vat. The preferred mechanism comprises a porous platform that normally rests on the vat bottom wall, and two lifter arms extending upwardly from the platform along inner side surfaces of the vat. When it is desired to remove accumulated sludge from the vat, handles on the upper ends of the lifter arms are grasped for lifting the porous platform out of the vat. Sludge in the resin is carried out of the vat, while the liquid resin drains through the porous platform into the vat. The mechanism accomplishes the sludge removal operation quickly, with minimal loss of liquid resin.

Specific features of the invention will be apparent from the attached drawings and description of an illustrative embodiment of the invention.

BRIEF DESCRIPTION OF THE DRAWINGS

FIG. 1 is taken on line 1—1 in FIG. 3.

DESCRIPTION OF A PREFERRED EMBODIMENT OF THE INVENTION

Figure 1:
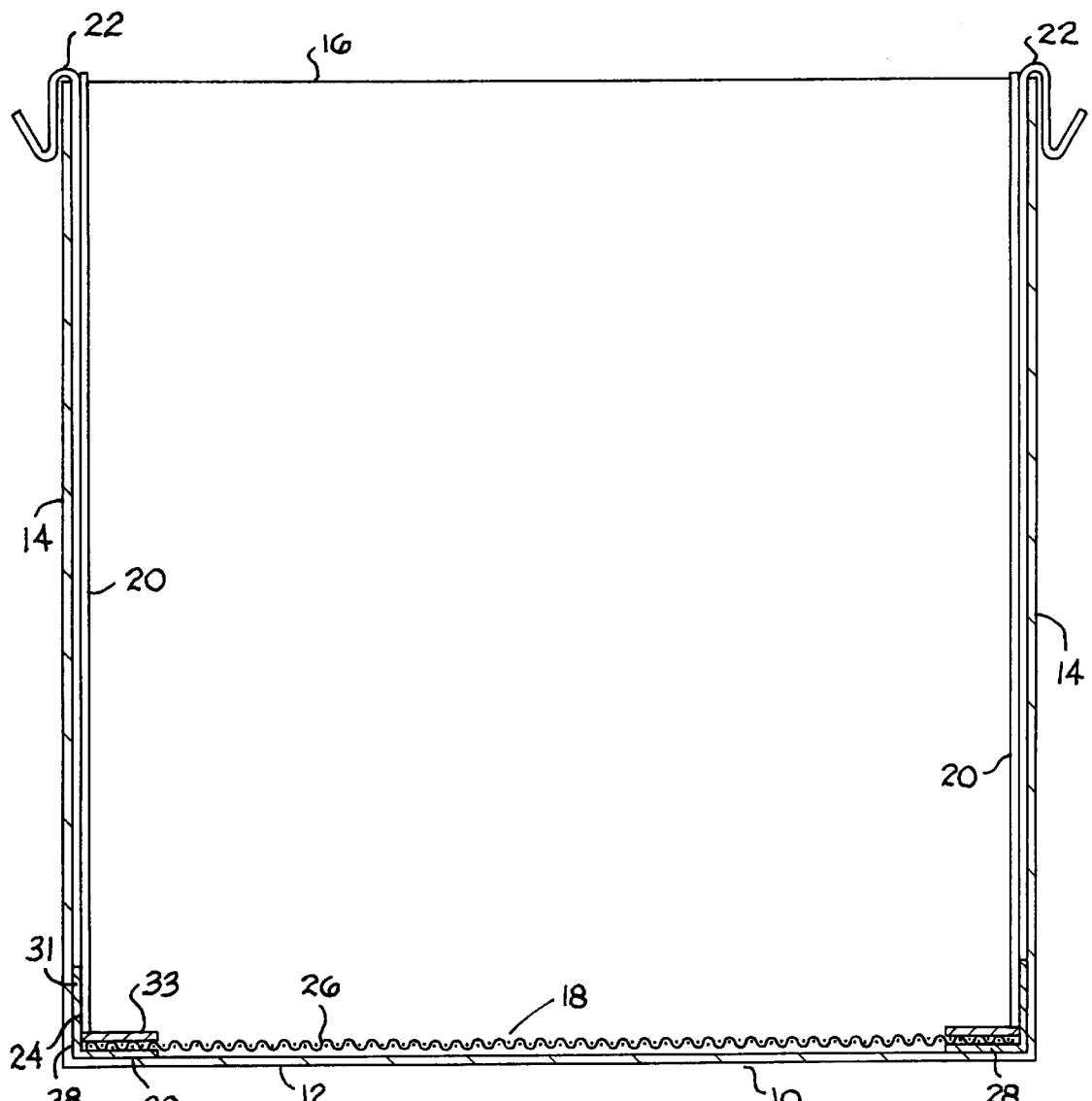
FIG. 1 is a sectional view taken through a resin vat equipped with a sludge removal mechanism of the present invention.
Figure 2:
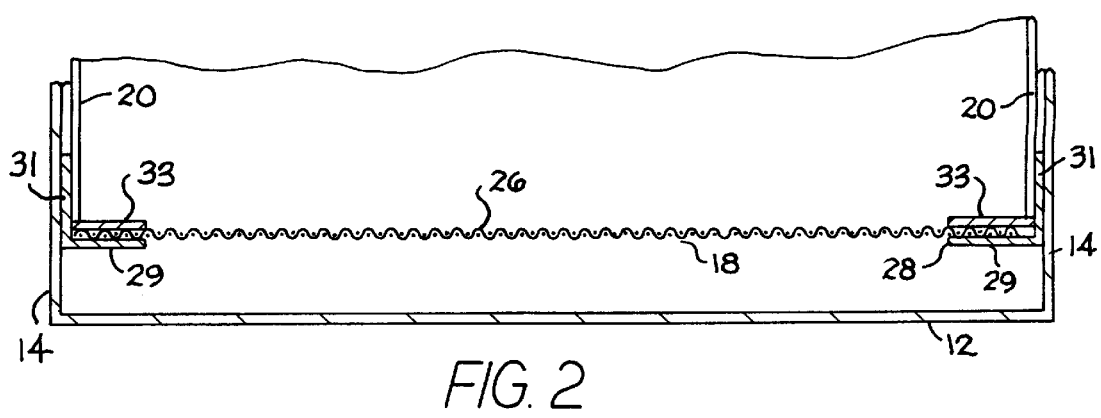
FIG. 2 is a fragmentary sectional view taken in the same direction as FIG. 1, but with the sludge removal mechanism partially raised out of the liquid resin vat.

FIG. 1 shows a liquid resin vat 10 that forms part of a laser-powered apparatus for forming three-dimensional objects by laser irradiation of a liquid resin contained in the vat. The apparatus can be similar to that shown in U.S. Pat. No. 4,575,330 or U.S. Pat. No. 5,184,307. One commercial supplier of such an apparatus is 3D Systems, located at 26081 Avenue Hall, Valencia, Calif. Typically, the apparatus comprises a movable-scanning laser mounted above vat 10 for directing a laser beam downwardly onto the resin surface so as to polymerize selected resin areas.

Vat 10 comprises a flat bottom wall 12 and four upstanding vertical sidewalls 14 having upper edges 16. The invention is particularly related to a sludge removal mechanism that can be placed in vat 10 for periodically removing sludge accumulations in the resin. The sludge removal mechanism remains in the vat while the laser is operating to radiate selected areas of the resin.

The sludge removal mechanism comprises a porous platform 18 adapted to rest on the vat bottom wall 12, two lifter arms 20 extending upwardly from platform 18 along the inner side surface of the vat walls 14, and a manual handle 22 secured to the upper end of each lifter arm.

Porous platform 18 comprises an annular rectangular frame 24 sized to fit into the vat interior space with minimal lateral play relative to the vat side walls, and a porous strainer screen 26 having peripheral edge areas anchored to frame 24. The frame comprises four angle members 28 formed of thin stainless steel having a wall thickness of about 0.06 inch. Each angle member has a horizontal leg 29 underlying an edge area of screen 26 and a vertical leg 31 extending closely alongside the vat side wall 14 when platform 18 is located within the vat.

Figure 3:
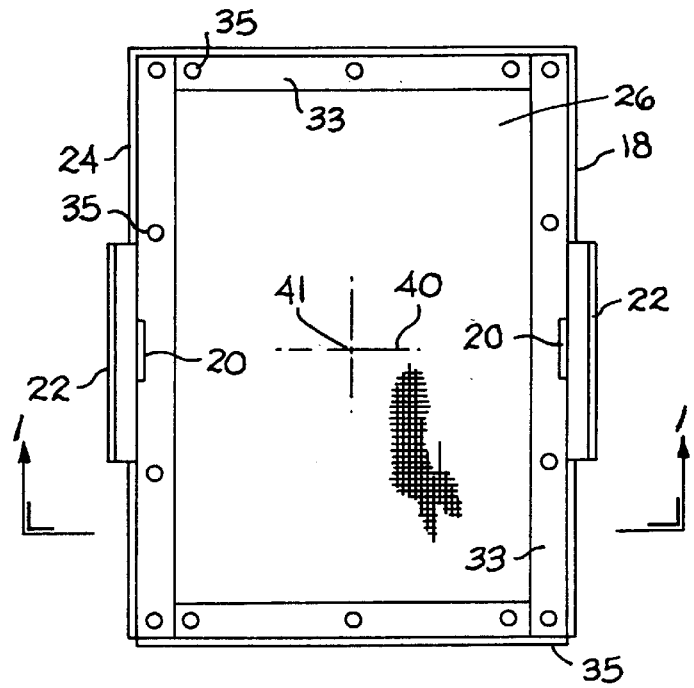
FIG. 3 is a top plan view of the FIG. 1 sludge removal mechanism.
Figure 4:
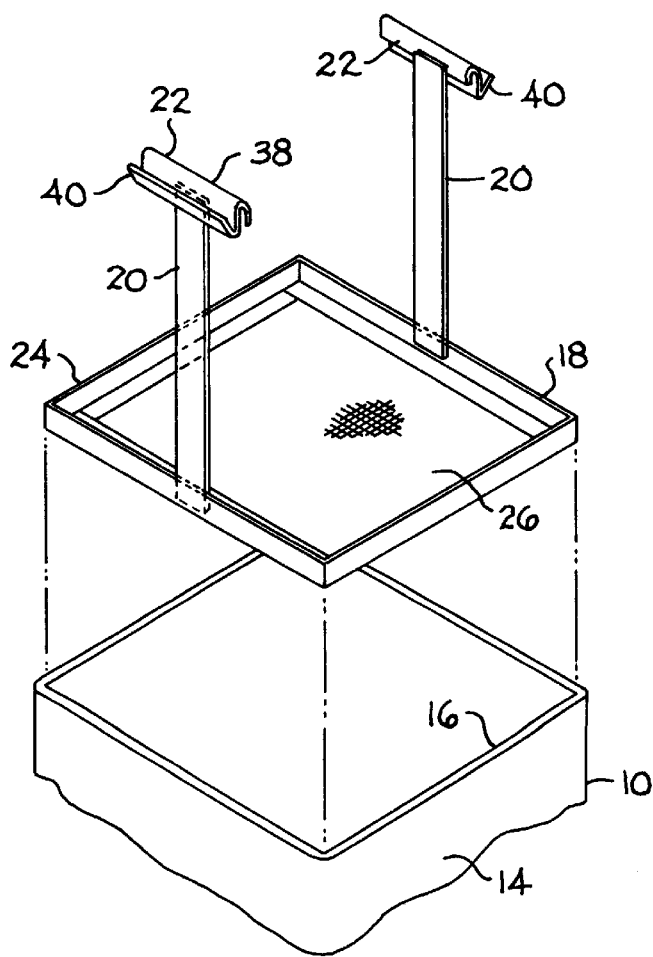
FIG. 4 is a perspective view of the FIG. 1 sludge removal mechanism shown above the associated liquid resin vat.

Frame 24 further comprises four clamping plates 33 overlying edge areas of screen 26 in vertical registry with horizontal legs 29 of the angle members. Clamping plates 33 are spot welded to the angle members, as indicated at 35 in FIG. 3, such that screen 26 is held in the frame by the spot welds and the clamping action of plates 33. Screen 26 can be a wire screen having about sixteen wires (openings) per linear inch.

Lifter arms 20 are formed out of flat strips having a wall thickness of about 0.06 inch. The lower end area of each lifter arm is welded to a vertical leg of one of the angle members 28. The upper end area of each lifter arm is welded to a handle 22. Each lifter arm is of sufficient length that the upper end of each arm is approximately in the plane of the vat upper edge 16 when the sludge removal means is disposed in the vat, as shown in FIG. 1.

Lifter arms 20 are diametrically opposed, so as to be located on an imaginary line 40 (FIG. 3) extending through the geometrical center 41 of platform 18. The aim is to achieve a balanced load on the person's arms when the person raises handles 22.

Figure 5:
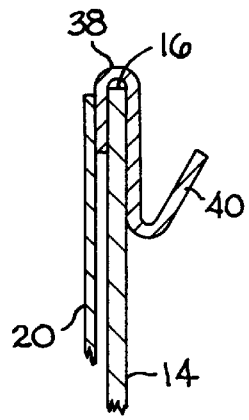
FIG. 5 is a fragmentary sectional view taken through a handle structure employed in the FIG. 1 sludge removal mechanism.

Each handle 22 is formed out of flat stock bent into a serpentine configuration, as shown in FIG. 5. Each handle comprises a U-bend 38 welded to the associated flat lifter arm 20, and an external flange 40 extending away 20 from arm 20. When the sludge removal means is in vat 10, each U-bend extends around the upper edge 16 of the associated vat side wall so as to preclude arm from vibrating or otherwise moving away from vat side wall 14. Handles 22 are located outside the vat plan dimension, to avoid the possibility of being in the path of the laser beam used to irradiate the liquid resin.

During use of the apparatus for forming three-dimension plastic objects, the sludge removal means is located in vat 10, as shown in FIG. 1; platform 18 rests on the vat bottom wall 12. When necessary to remove sludge accumulations from the resin, handles 22 are grasped and pulled upwardly to lift platform 18 out of the vat. Liquid resin drains through the screen 26 openings, while the semi-solid sludge is retained on the upper surface of the screen. Vertical legs 31 of the angle members 28 prevent sludge from falling over the edge of the platform back into the vat.

The sludge removal operation is relatively quick, and without significant loss of liquid resin.

After the sludge has been removed from platform 18, the sludge-free platform is returned to the vat.

What is claimed is:

1. In a laser-powered apparatus for forming three dimensional objects by irradiation of a liquid resin, the combination comprising:

an upstanding vat adapted to contain the liquid resin; said vat comprising a flat planar bottom wall, and vertical side walls extending upwardly from said bottom wall; said vertical side walls having upper edges located above a plane of said bottom wall; and a liftable platform means removably disposed in said vat for removing resinous sludge that accumulates over time in the vat; said platform means comprising a frame adapted to rest on the vat bottom wall, a planar strainer screen having peripheral edge areas anchored to said frame, two lifter arms extending upwardly from said frame normal to the plane of the strainer; and a handle connected to each lifter arm; each handle being located outside the vat near the upper edge of an associated vat vertical side wall.

2. The apparatus of claim 1, wherein said screen has an upper surface and a lower surface; said frame comprising plural angle members underlying edge areas of the screen, and plural clamping plates overlying edge areas of the screen.

3. The apparatus of claim 2, wherein each said angle member has a vertical leg slidable on the vertical side wall of the vat and a horizontal leg extending along the screen lower surface.

4. The apparatus of claim 3, and further comprising spot welds joining each said clamping plate to the horizontal leg of the associated angle member.

5. The apparatus of claim 1, wherein each said lifter arm comprises a flat strip extending upwardly from said frame in close proximity to the vertical side wall of the vat.

6. The apparatus of claim 5, wherein each said handle is a flat plate having a U-bend secured to the upper end of the associated flat strip and an external flange extending angularly from one leg of said U-bend.

7. The apparatus of claim 6, wherein each said U-bend is sized to extend around the upper edge of the vertical side wall of the vat.

8. A liftable platform mechanism adapted for removable disposition within a vat containing a liquid resin that is to be irradiated to form a three dimensional object, said platform mechanism comprising:

a liftable platform means adapted to rest on a vat bottom wall; said platform means comprising an multi-sided frame, a planar strainer screen having peripheral edge areas anchored to said frame, two lifter arms extending upwardly from said frame normal to a plane of the strainer screen; and a handle connected to each lifter arm; each handle being located on a surface of the associated lifter arm that faces away from the frame, whereby the handles are located outside the vat when the platform mechanism is located in the vat;

said multi-sided frame comprising plural angle members connected together in a common plane; each angle member comprising a horizontal leg underlying an edge area of the screen, and a vertical leg adapted to slide on a vertical side wall of the vat during installation or removal of the lifter mechanism; and clamping plates overlying edge areas of the screen in vertical registry with the horizontal legs of said angle members.

9. The mechanism of claim 8, and further comprising spot welds joining each said clamping plate to the associated angle member.

10. The mechanism of claim 8, wherein each said lifter arm comprises a flat linear strip extending upwardly from the vertical leg of one of said angle members.

11. The mechanism of claim 10, wherein each said handle comprises a flat plate having a U-bend secured flatwise to an upper end of an associated linear strip, and an external flange extending angularly from one leg of said U-bend.

12. The mechanism of claim 11, wherein each said U-bend is sized to extend around an upper edge of the vertical of the vat sidewall.

* * * * *